(12) United States Patent
Bennati et al.

(10) Patent No.: US 10,144,371 B1
(45) Date of Patent: Dec. 4, 2018

(54) GROUNDING ELEMENT INCLUDING BLOCK AND PLATE

(71) Applicant: GM GLOBAL TECHNOLOGY OPERATIONS LLC, Detroit, MI (US)

(72) Inventors: Bruno C. Bennati, Flat Rock, MI (US); Luke A. Reini, Clarkston, MI (US)

( * ) Notice: Subject to any disclaimer, the term of this patent is extended or adjusted under 35 U.S.C. 154(b) by 0 days.

(21) Appl. No.: 15/720,155

(22) Filed: Sep. 29, 2017

(51) Int. Cl.
| | |
|---|---|
| *H01R 4/66* | (2006.01) |
| *B60R 16/02* | (2006.01) |
| *H01R 13/658* | (2011.01) |
| *H01R 4/34* | (2006.01) |
| *H01R 11/11* | (2006.01) |
| *H01R 4/64* | (2006.01) |

(52) U.S. Cl.
CPC .......... *B60R 16/0215* (2013.01); *H01R 4/34* (2013.01); *H01R 4/64* (2013.01); *H01R 11/11* (2013.01); *H01R 13/65802* (2013.01); *H01R 2201/26* (2013.01)

(58) Field of Classification Search
CPC .................... H01R 13/648; H01R 13/6485
USPC ............................... 439/92, 794, 798
See application file for complete search history.

(56) References Cited

U.S. PATENT DOCUMENTS

| | | | | |
|---|---|---|---|---|
| 4,486,058 A | * | 12/1984 | Takagi | H01R 9/16 439/544 |
| 9,118,125 B2 | * | 8/2015 | Saitou | H01R 11/01 |

* cited by examiner

*Primary Examiner* — Phuong Dinh

(57) ABSTRACT

A grounding element is provided. The grounding element includes a metal plate; and a metal block attached to the metal plate. The grounding element may be welded to a body or frame of a vehicle and used to provide a plurality of attachment points for a vehicle wiring harness.

18 Claims, 2 Drawing Sheets

GROUNDING ELEMENT INCLUDING BLOCK AND PLATE

BACKGROUND

Apparatuses and systems consistent with exemplary embodiments relate to electrical grounding devices. More particularly, apparatuses consistent with exemplary embodiments provide electrical grounding devices for wiring harnesses.

SUMMARY

One or more exemplary embodiments provide a grounding element. More particularly, one or more exemplary embodiments provide a grounding element including a stamped sheet metal plate and a machined block.

According to an aspect of an exemplary embodiment, a grounding element is provided. The grounding element includes a metal plate; and a metal block attached to the metal plate.

The metal plate may be a stamped sheet metal plate and the metal block may be a machined block.

The metal plate may include a first portion comprising a first plurality of holes.

The metal block may include a second plurality of holes aligned with the first plurality of holes. The second plurality of holes may be non-threaded.

The metal plate may be welded to the metal block.

The first plurality of holes and the second plurality of holes may be configured to receive a wiring harness connector.

The metal plate may include a first portion including the first plurality of holes, two second portions substantially perpendicular to and extending from the first portion, and two flanges substantially perpendicular to and extending from the two second portions.

The metal block is attached to the metal plate such that is fixed under the first portion and in between the two second portions.

The metal plate comprises a third plurality of holes disposed on the two second portions configured to receive the weld.

The two flanges may be configured to be resistance spot-welded to a sheet metal panel. The sheet metal panel may be part of a vehicle.

The grounding element may further include a plurality of wiring harness connectors respectively disposed in the first plurality of holes and the corresponding second plurality of holes. The metal sheet and the metal block may be aluminum or steel.

A first thickness of the metal block is greater than a second thickness of the metal sheet.

The metal block may be attached to the metal sheet such that a bottom of the metal block is higher than the flanges of the metal sheet.

According to an aspect of an exemplary embodiment, a grounding element is provided. The grounding element includes a metal plate comprising a first portion including a plurality of slots, and one or more flanges substantially perpendicular to and extending from the first portion; and a metal block attached to the metal plate such that is fixed to a side of the first portion and above the one or more flanges.

The metal plate may include a plurality of protrusions extending longitudinally from the first portion in a direction above the metal block. The metal plate may include one or more curved portions substantially perpendicular to and extending from the first portion, the one or more curved portions disposed in between the one or more flanges.

Other objects, advantages and novel features of the exemplary embodiments will become more apparent from the following detailed description of exemplary embodiments and the accompanying drawings.

DETAILED DESCRIPTION

Figure 1:
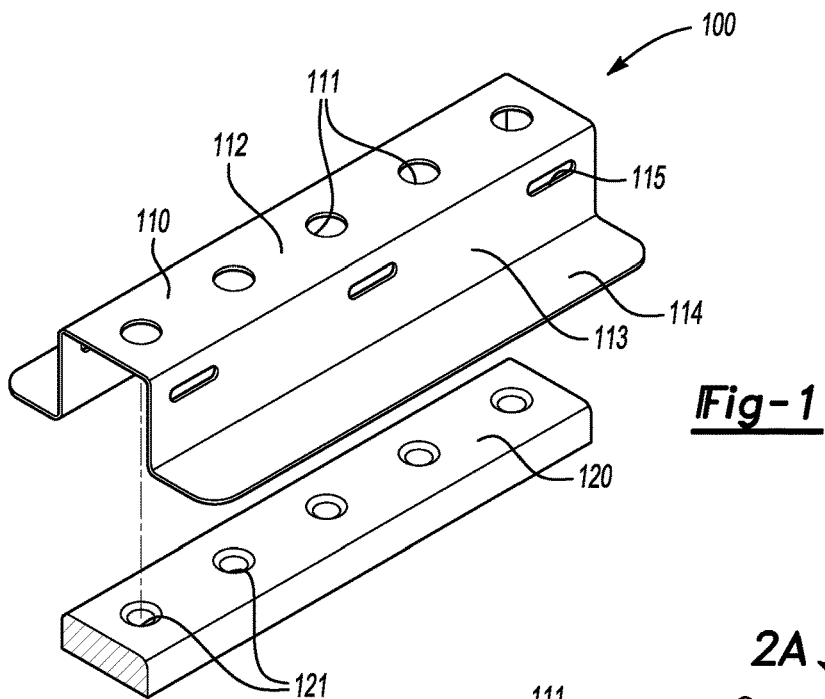
FIG. 1 shows a perspective view of a grounding element according to an exemplary embodiment.

Grounding elements are used to ground electrical systems. One application of a grounding element is to ground electrical systems of a vehicle. Grounding elements may be provided at various locations in a vehicle and on a vehicle frame or a frame of another apparatus to ground various vehicle electrical systems. However, this arrangement may increase the complexity of the electrical systems and increase the number of parts of the electrical system. Thus, a simplified way to ground various vehicle electrical systems would be beneficial by reducing the complexity of the electrical systems and reducing the number of parts required to ground the electrical systems.

A grounding element will now be described in detail with reference to FIGS. 1-4 of the accompanying drawings in which like reference numerals refer to like elements throughout the disclosure. The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element unless it is stated that a first element is "directly" connected to, formed on, or disposed on the second element.

FIG. 1 shows a perspective view of a grounding element 100 according to an exemplary embodiment. Referring to FIG. 1, the grounding element 100 includes a first metal part 110 and a second metal part 120. The second metal part 120 may be attached to the first metal part 110, such that the second metal part 120 is disposed in an inner portion of the first metal part 110 and elevated higher than flaps or flanges serving as attachment points of the first metal part 110 to a body or a panel.

The first metal part 110 and the second metal part 120 may comprise aluminum or steel. The thickness of the second metal part may 120 may be greater than the thickness of the first metal part 110.

The first metal part 110 may have a first plurality of holes 111 serving as attachment points for the first metal part 110 to one or more wiring harnesses. The first plurality of holes 111 may be disposed on a top portion 112 of the first metal part 110. The first metal part 110 may be a stamped sheet metal plate or bracket.

The top portion 112 (i.e., first portion) may be flat. Side panels 113 (i.e., second portions) may extend longitudinally from the top portion 112. The side panels 113 may be substantially perpendicular to the top portion 112. The two side panels 113 may include a plurality of slots 115 serving as welding points for welding such as metal inert gas (MIG) welding of the second metal part 120 to the first metal part 110.

Two flanges or flaps 114 may extend horizontally from the two side panels, respectively. The two flanges or flaps 114 may extend away from the top portion 112 and be substantially perpendicular to the two side panels 113. The two flanges or flaps 114 may serve as attachment points or for resistance spot welding to a body or a panel of a vehicle or other apparatus.

The second metal part 120 may be a metal block or machined block. The second metal part 120 may include a second plurality of holes 121. The second plurality of holes 121 may be unthreaded or non-threaded and may be aligned to corresponding holes of the first plurality of holes 111. The second plurality of holes 121 may be configured to receive wiring harness connectors.

Figure 2:
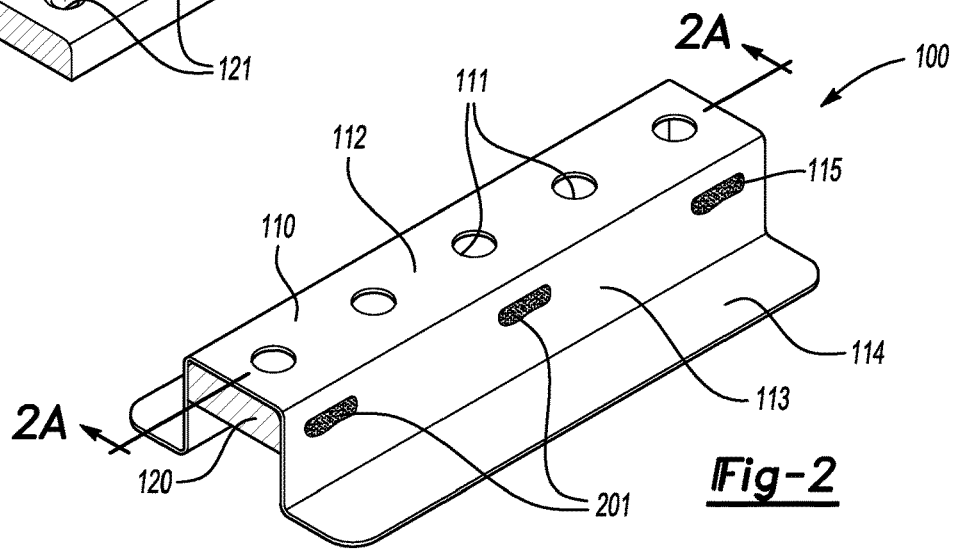
FIG. 2 and FIG. 2A show a cross-sectional view of a grounding element according to an aspect of an exemplary embodiment.
Figure 2A:
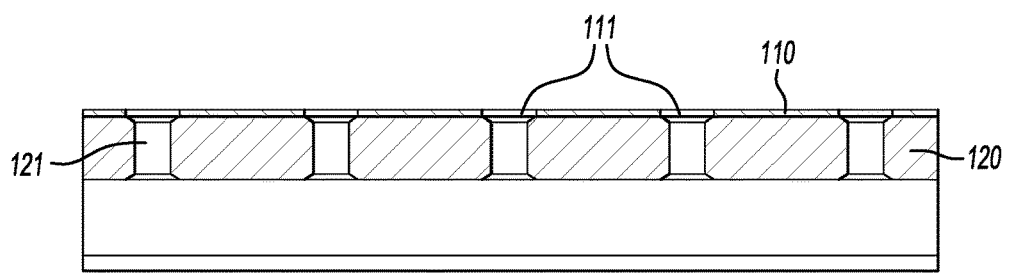

FIG. 2 and FIG. 2A show a cross-sectional view of a grounding element 100 according to an aspect of an exemplary embodiment. Referring to FIG. 2A, the second metal part 120 and its second plurality of holes 121 is attached to the first metal part 110 via MIG welds 201. The second metal part 120 is fixed in a center area of the first metal part 110 and is elevated such that a bottom of the second metal part 120 is higher than the flanges or flaps 114.

Figure 3:
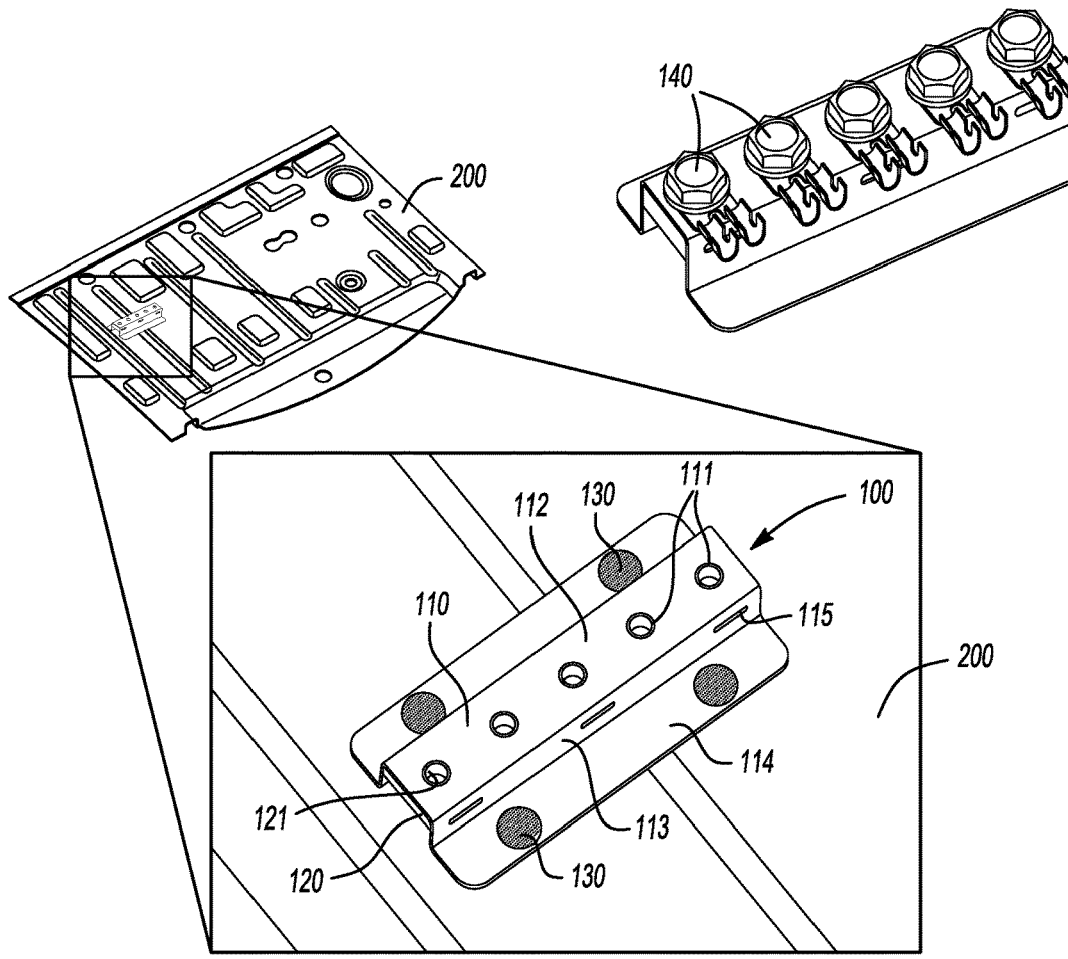
FIG. 3 shows a grounding element used in various applications according to an aspect of an exemplary embodiment.

FIG. 3 shows a grounding element used in various applications according to an aspect of an exemplary embodiment. Referring to FIG. 3, the grounding element 100 is attached to sheet metal panel 200 via resistance spot welds 130 on the flaps 114. Moreover, wiring harness connectors 140 may be disposed in the plurality of first holes 111 and the plurality of second holes 121 and be used to attach wiring harnesses to the grounding element 100.

Figure 4:
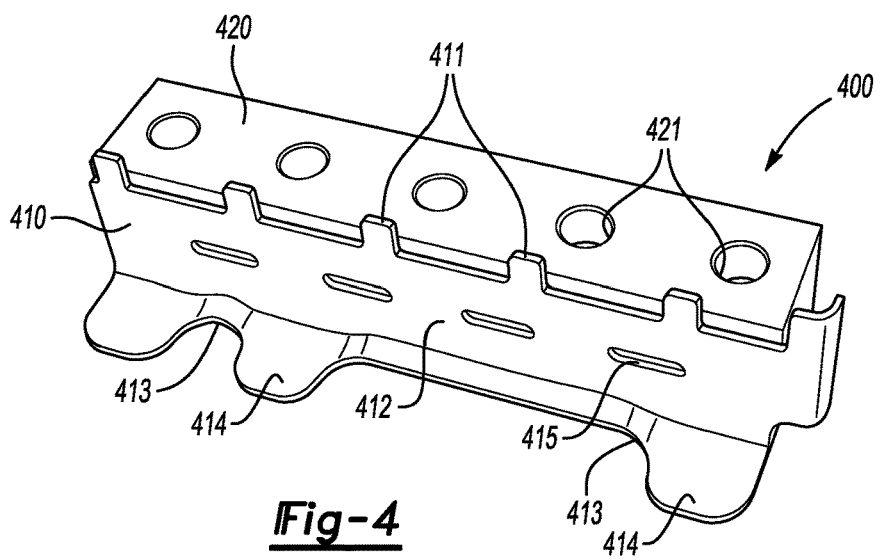
FIG. 4 shows a perspective view of a grounding element according to an exemplary embodiment.

FIG. 4 shows a perspective view of a grounding element 400 according to an exemplary embodiment. Referring to FIG. 1, the grounding element 400 includes a first metal part 410 and a second metal part 420. The second metal part 420 may be attached to the first metal part 410, such that the first metal part 410 is disposed on a side perpendicular to the top portion of the second metal part 420 that includes holes 421.

The first metal part 410 and the second metal part 1420 may comprise aluminum or steel. The thickness of the second metal part may 420 may be greater than the thickness of the first metal part 410.

The first metal part 410 may have a main portion 412 and flaps or flanges 414. The first metal part 410 may be a stamped sheet metal plate or bracket. The main portion 412 (i.e., first portion) may be flat. The main portion 412 may include a plurality of slots 415 serving as welding points for welding such as metal inert gas (MIG) welding of the second metal part 420 to the first metal part 410. Protruding portions 411 (i.e., second portions) may extend longitudinally from the main portion 412. Protruding portions 412 may prevent rotation of the wiring harness and/or wiring harness attachment point.

One or more flanges or flaps 414 may extend horizontally from a side of the first metal part 410. The flanges or flaps 414 may extend away from the main portion 412 of the first metal part that is to be fixed or attached to the second metal part 420 and may be substantially perpendicular to main portion 412 of the first metal part 410 that includes slots 415. The flanges or flaps 414 may serve as attachment points or for resistance spot welding to a body or a panel of a vehicle or other apparatus. Protruding or curved portions 413 (i.e., second portions) may also extend away or perpendicularly from the main portion 412 and curved in longitudinal direction to accommodate channels or protrusions on a body that the flanges or flaps 414 are to be attached. However, protruding or curved portions 413 may be shorter horizontally than or extend away perpendicularly from the main portion for a distance than flaps or flanges 414.

The second metal part 420 may be a metal block or machined block. The second metal part 420 may include a second plurality of holes 421. The second plurality of holes 421 may be unthreaded or non-threaded and may be disposed on the top portion of the second metal part 420. The second plurality of holes 421 may be configured to receive wiring harness connectors.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A grounding element comprising:
   a metal plate including a first portion comprising a first plurality of holes; and
   a metal block attached to the metal plate, the metal block comprising a second plurality of holes aligned with the first plurality of holes.

2. The grounding element of claim 1, wherein the metal plate comprises a stamped sheet metal plate.

3. The grounding element of claim 2, wherein the metal block comprises a machined block.

4. The grounding element of claim 1, wherein the second plurality of holes are non-threaded.

5. The grounding element of claim 4, wherein the metal plate is welded to the metal block.

6. The grounding element of claim 5, wherein the first plurality of holes and the second plurality of holes are configured to receive a wiring harness connector.

7. The grounding element of claim 6, wherein the metal plate comprises a first portion including the first plurality of holes, two second portions substantially perpendicular to and extending from the first portion, and two flanges substantially perpendicular to and extending from the two second portions.

8. The grounding element of claim 7, wherein the metal block is attached to the metal plate such that is fixed under the first portion and in between the two second portions.

9. The grounding element of claim 8, wherein the metal plate comprises a third plurality of holes disposed on the two second portions configured to receive the weld.

10. The grounding element of claim 9, wherein the two flanges are configured to be resistance spot-welded to a sheet metal panel.

11. The grounding element of claim 10, wherein the sheet metal panel is part of a vehicle.

12. The grounding element of claim 11, further comprising a plurality of wiring harness connectors respectively disposed in the first plurality of holes and the corresponding second plurality of holes.

13. The grounding element of claim 12, wherein the metal sheet and the metal block comprise aluminum or steel.

14. The grounding element of claim 13, wherein a first thickness of the metal block is greater than a second thickness of the metal sheet.

15. The grounding element of claim 14, wherein the metal block is attached to the metal sheet such that a bottom of the metal block is higher than the flanges of the metal sheet.

16. A grounding element, the grounding element comprising:
- a metal plate comprising a first portion including a plurality of slots, and one or more flanges substantially perpendicular to and extending from the first portion; and
- a metal block attached to the metal plate such that the metal block is fixed to a side of the first portion and above the one or more flanges.

17. The grounding element of claim 16, wherein the metal plate comprises a plurality of protrusions extending longitudinally from the first portion in a direction above the metal block.

18. The grounding element of claim 17, wherein the metal plate comprises one or more curved portions substantially perpendicular to and extending from the first portion, the one or more curved portions disposed in between the one or more flanges.

* * * * *